(12) United States Patent
Stall et al.

(10) Patent No.: US 7,401,323 B2
(45) Date of Patent: Jul. 15, 2008

(54) JUST-MY-CODE DEBUGGING

(75) Inventors: Jonathon Michael Stall, Bothell, WA (US); Michael M. Magruder, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 10/419,384

(22) Filed: Apr. 21, 2003

(65) Prior Publication Data

US 2004/0210876 A1    Oct. 21, 2004

(51) Int. Cl.
  *G06F 9/44* (2006.01)
(52) U.S. Cl. .................. 717/130; 717/124; 717/127; 717/129
(58) Field of Classification Search ......... 717/124–133; 714/38–49
  See application file for complete search history.

(56) References Cited

U.S. PATENT DOCUMENTS 6,681,343 B1 * 1/2004 Nakabo ................ 714/38
6,681,384 B1 * 1/2004 Bates et al. .............. 717/129
6,826,746 B2 * 11/2004 Evans et al. .............. 717/124
2002/0129337 A1   9/2002 Evans et al.
2003/0149961 A1 * 8/2003 Kawai et al. ............. 717/124
2004/0123279 A1 * 6/2004 Boykin et al. ............ 717/130
2004/0230955 A1 * 11/2004 Pugh et al. ............... 717/124

* cited by examiner

*Primary Examiner*—William H Wood
(74) *Attorney, Agent, or Firm*—Lee & Hayes, PLLC

(57) ABSTRACT

Systems and methods for Just-My-Code (JMC) debugging are described. In one aspect, debugging probes are automatically inserted into respective programming constructs representing interesting code. The debugging probes are inserted during computer computer-program compiling operations that generate native code. The native code is then executed as a process. The process includes one or more threads of execution that run-free through uninteresting code during a JMC step operation. A thread of the one or more threads is only halted in the interesting code when an active one of the debugging probes is encountered by the thread while the thread is JMC stepping through the process.

33 Claims, 3 Drawing Sheets

JUST-MY-CODE DEBUGGING

TECHNICAL FIELD

The invention pertains to software development.

BACKGROUND

Debugging typically involves the use of a debugger, a tool that allows a software developer to observe run-time behavior of a computer-program and locate semantic errors. Some debugging commands such as a stop command allow the programmer to halt execution of a running process at any time. Whereas manual insertion of breakpoints allow the programmer to halt the process when predetermined points in the code have been reached. The debuggee runs free until it hits a break op-code in the instruction stream, at which point the operating system (OS) will halt the debuggee until the debugger continues the debuggee. Thus, when debugging a computer-program, the program is either running (i.e., executing as a process) or halted. Certain debugging commands, such as step-into, step over, and step-out commands, function only in break mode (i.e., when the debugee is halted), and allow the programmer to step through the program state, observe and/or modify content of variables, pointers, and/or the like.

Traditional stepping is done via placing break op-codes at strategic points via static analysis of the instruction stream, and then running free until a respective patch is encountered (hit). For instance, step-in places a patch at the start of the function being stepped into, step-over places a patch after a line being stepped over, and step-out places a patch at an instruction that will execute once a current function returns. Unfortunately, such conventional stepping commands do not allow programmers to automatically skip "uninteresting code". Rather, as described above, programmers are required to manually insert breakpoints in interesting code and execute until a breakpoint is hit, and/or manually step-through uninteresting code to get to the interesting code. In other words, programmers may be required to iteratively (line-by-line) step-into and through uninteresting code, step-over a function and possibly land in uninteresting code, and/or step-out of a function and possibly land in uninteresting code.

For instance, step-into and step-over commands differ only in the way they handle function calls. Either command instructs the debugger to execute the next line of source code. If the line contains a function call, the step-into command executes only the call itself, and then halts at the first line of code inside the function, regardless of whether that first line of code is uninteresting code. The step-over command executes the entire function, and then halts at the first line outside the function, regardless of whether that first line is uninteresting code. On a nested function call, step-into steps into the most deeply nested function. For instance, if step-into is used on a call like F1(F2( )), the debugger steps into the function F2. The step-out command is used to step-out of a function by resuming program execution until the function returns, and then breaks execution at the return point in the calling function, regardless of whether the return point corresponds to uninteresting code.

Additionally, although a debugger can be instructed to iteratively execute the step-in command for each respective line of code to single step-through a portion of code, this process substantially reduces debugging process performance and substantially increase risk of process deadlock (i.e., contention for a same cache-line because the debugger). For instance, to emulate multiple iterative step-in operations, the debugger, for each line of code: inserts a breakpoint at the next instruction, runs the process, catches the associated exception, and then examines the instruction pointer to determine if a preconfigured stopping point has been reached (or until the debugger has been manually stopped). As can be appreciated such iterative operations, wherein the debugger does not execute more than a single line of code before another exception is thrown (i.e. the code is only allowed to "run-free" for a very short amount of time) can considerably hinder debugging performance and increase the possibility of process deadlocks. For purposes of discussion, code that runs-free is a logical block of code such as a method or uninteresting code that is allowed to execute unhindered by encountered breakpoints.

Such debugging limitations become especially problematic when the computer-program being debugged is designed to operate in a sophisticated environment that integrates large amounts of code that the programmer is not interested in debugging. Such uninteresting code may include, for example, code that the programmer did not write, already debugged code, other shared code, networked service code, interoperability framework code, and/or the like. In such a scenario, existing techniques to debug a program that do not allow the programmer to easily skip uninteresting code may require time consuming and labor intensive efforts that could become overwhelming to both novice and experienced programmers alike.

Accordingly systems and methods to allowing a user to debug only code of interest, without having to manually set breakpoints in interesting code, and/or manually step-through uninteresting code to reach interesting code are greatly desired.

SUMMARY

Systems and methods for Just-My-Code (JMC) debugging are described. In one aspect, debugging probes are automatically inserted into respective programming constructs representing interesting code. The debugging probes are inserted during computer computer-program compiling operations that generate native code. The native code is then executed as a process. The process includes one or more threads of execution that run-free through uninteresting code during a JMC step operation. A thread of the one or more threads is only halted in the interesting code when an active one of the debugging probes is encountered by the thread while the thread is JMC stepping through the process.

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

Overview

Figure 1:
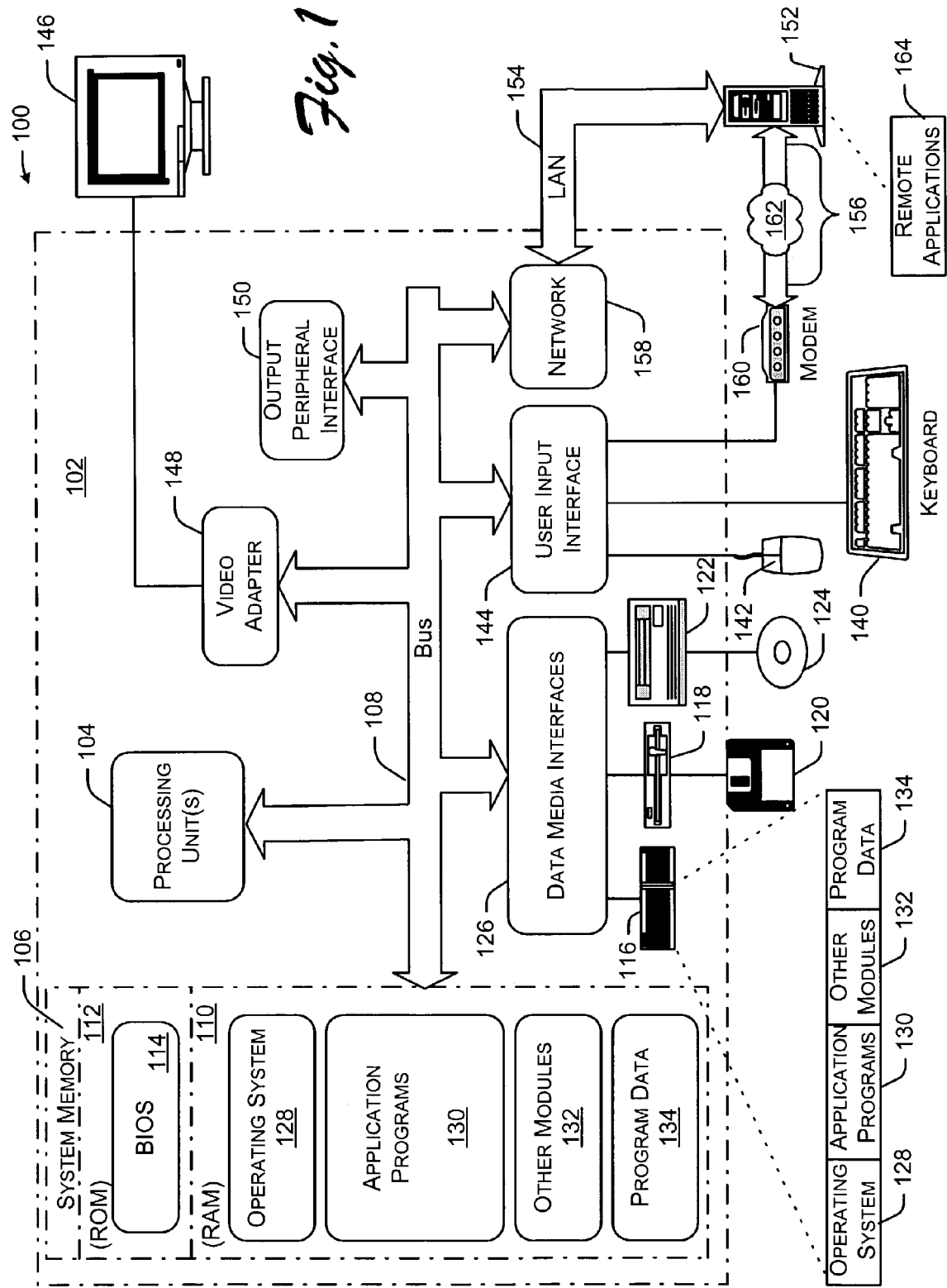
FIG. 1 shows an exemplary computing environment within which systems and methods for debugging Just-My-Code may be implemented.

To address the above described limitations of conventional debugging techniques, systems and methods for Just-My-Code (JMC) debugging are described that automatically skip uninteresting code during debugging operations. For purposes of discussion, uninteresting code is code that, for whatever reason, is not considered to be pertinent to the programmer's debugging efforts at that time (e.g., code that the programmer did not write, already debugged code, and so on.) "Interesting code" is the corollary to uninteresting code because it is of interest to the programmer during debugging operations.

In particular, various embodiments of the invention allow a debugging application (a debugger) to mark arbitrary methods in an assembly as interesting. During Just-In-Time (JIT) compiler operations to generate native code from the assembly, debugging probes are automatically inserted into the interesting methods. Using the debugger, a user loads the native code into a process for debugging. Responsive to JMC stepping operations, process execution is automatically halted only when JMC stepping thread(s) encounter the interesting methods. All non-JMC stepping threads run-freely through interesting and non-interesting code. This means that the user is not required to manually set breakpoints in interesting code, nor is the programmer required to wade-through (i.e., perform conventional stepping operations) uninteresting code to reach interesting code.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 100 on which the subsequently described systems, apparatuses and methods for Just-My-Code (JMC) debugging may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention may also be practiced in distributed computing environments where tasks are performed by remote processing devices that are linked through a communications network. In a distributed computing environment, program modules may be located in both local and remote memory storage devices.

As shown in FIG. 1, computing environment 100 includes a general-purpose computing device in the form of a computer 102. The components of computer 102 can include, by are not limited to, one or more processors or processing units 104, a system memory 106, and a bus 108 that couples various system components including system memory 106 to processor 104. The system bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 102 typically includes a variety of computer readable media. Such media may be any available media that is accessible by computer 102, and it includes both volatile and non-volatile media, removable and non-removable media. In FIG. 1, system memory 106 includes computer readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during start-up, is stored in ROM 112. RAM 110 typically contains data and/or program modules that are immediately accessible to and/or presently being operated on by processor 104.

Computer 102 may further include other removable/non-removable, volatile/non-volatile computer storage media. For example, FIG. 1 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM/R/RW, DVD-ROM/R/RW/+R/RAM or other optical media. Hard disk drive 116, magnetic disk drive 118 and optical disk drive 122 are each connected to bus 108 by one or more interfaces 126.

The drives and associated computer-readable media provide nonvolatile storage of computer readable instructions, data structures, program modules, and other data for computer 102. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A user may provide commands and information into computer 102 through input devices such as keyboard 140 and pointing device 142 (such as a "mouse"). Other input devices (not shown) may include a microphone, joysteick, game pad, satellite dish, serial port, scanner, camera, etc. These and other input devices are connected to the processing unit 104 through a user input interface 144 that is coupled to bus 108, but may be connected by other interface and bus structures, such as a parallel port, game port, or a universal serial bus (USB).

A monitor 146 or other type of display device is also connected to bus 108 via an interface, such as a video adapter 148. In addition to monitor 146, personal computers typically include other peripheral output devices (not shown), such as speakers and printers, which may be connected through output peripheral interface 150.

Computer 102 may operate in a networked environment using logical connections to one or more remote computers, such as a remote computer 152. Remote computer 152 may include many or all of the elements and features described herein relative to computer 102. Logical connections shown in FIG. 1 are a local area network (LAN) 154 and a general wide area network (WAN) 156. Such networking environments are commonplace in offices, enterprise-wide computer networks, intranets, and the Internet.

When used in a LAN networking environment, computer 102 is connected to LAN 154 via network interface or adapter 158. When used in a WAN networking environment, the computer typically includes a modem 160 or other means for establishing communications over WAN 156. Modem 160, which may be internal or external, may be connected to system bus 108 via the user input interface 144 or other appropriate mechanism. Depicted in FIG. 1, is a specific implementation of a WAN via the Internet. Here, computer 102 employs modem 160 to establish communications with at least one remote computer 152 via the Internet 162.

In a networked environment, program modules depicted relative to computer 102, or portions thereof, may be stored in a remote memory storage device. Thus, e.g., as depicted in FIG. 1, remote application programs 164 may reside on a memory device of remote computer 152. It will be appreciated that the network connections shown and described are exemplary and other means of establishing a communications link between the computers may be used.

A number of program modules may be stored on the hard disk, magnetic disk 120, optical disk 124, ROM 112, or RAM 110, including, e.g., an operating system (OS) 128 to provide a run-time environment, application programs 130 for Just-My-Code (JMC) debugging, other program modules 132 (e.g., device drivers, etc.), and program data 134 such source code, intermediate assemblies, and/or the like.

Figure 2:
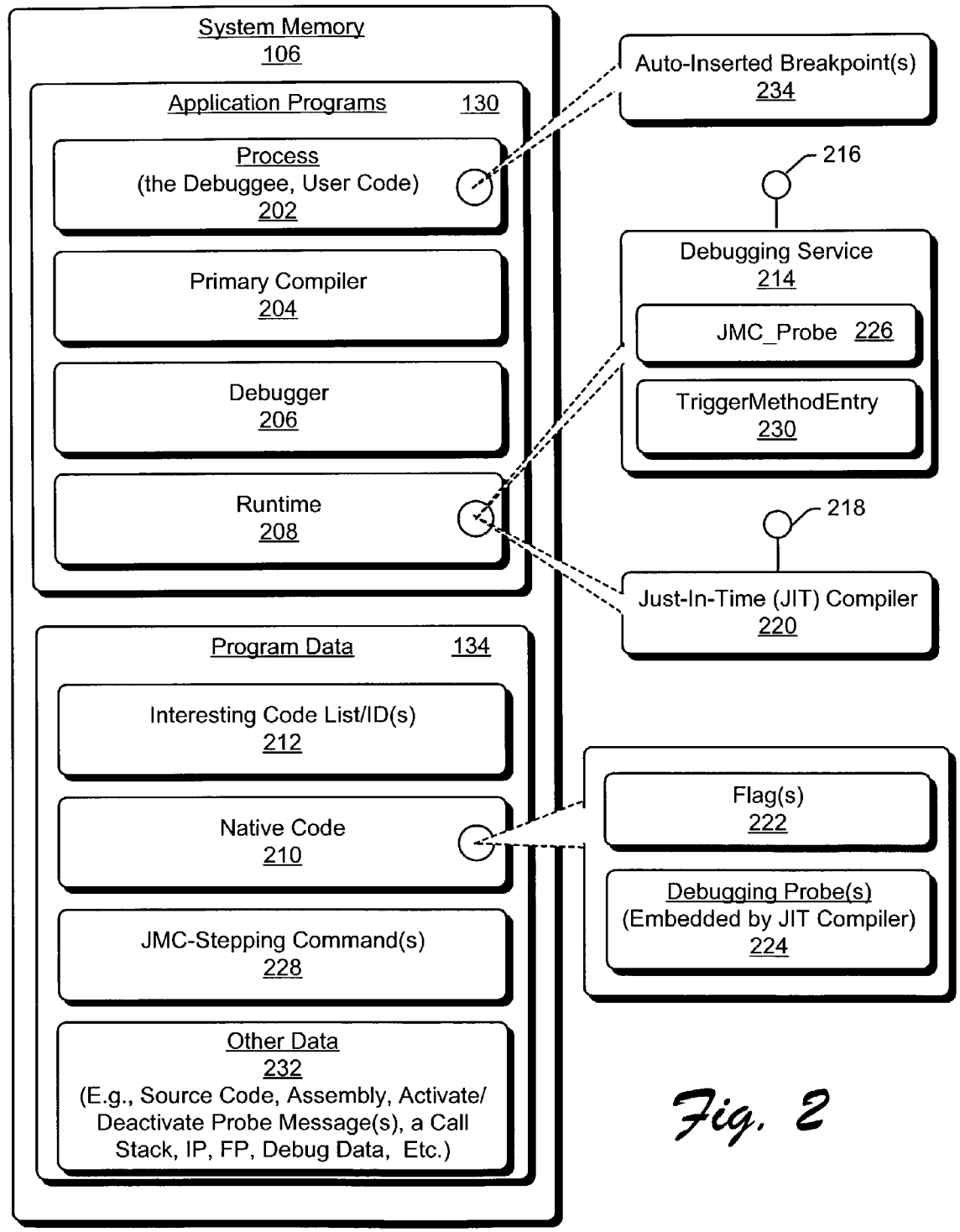
FIG. 2 shows further exemplary aspects of system memory of FIG. 1, including application programs and program data for debugging Just-My-Code.

FIG. 2 is a block diagram that shows further exemplary aspects of system memory 106 of FIG. 1, including application programs 130 and program data 134 for Just-My-Code (JMC) debugging. Application programs 130 and program data 134 include, for example a process 202, a primary compiler 204, a debugging program ("debugger") 206 for debugging the process 202, and a shared runtime component ("runtime") 208. The process 202 is the result of source code (not shown) that has been compiled to an assembly (not shown), which in turn has been compiled to native code 210; the process 202 represents execution of the native code 210 by the debugger 206.

Source code represents any type of computer-programming codes written in any type of computer-programming language. A primary compiler 204 with a debug switch turned on (e.g., "/debug") to compile the source code into the assembly (not shown). Such a primary compiler can be any computer-program language compiler such as a C, C++, C#, Visual Basic, and/or other type of compiler that has been modified to implement JMC debugging. Assemblies are known, and represent an intermediate stage in the conversion of source code into platform specific native code for execution. To this end, such an assembly includes, for example, platform/processor independent intermediate language (IL) and corresponding metadata.

A user loads the assembly into the debugger 206. Techniques for loading an assembly into a debugging application are known. For example, an assembly can be loaded into the debugger 206 by specifying (e.g., via command-line or UI) the assembly name or otherwise selecting the assembly. During assembly loading operations, the debugger 206 generates a list of interesting code 212 to differentiate portions of the assembly that are interesting code as compared to uninteresting code. User code (iteratively: source code converted to an assembly, and eventually, as described below, converted to native code that is executed as a process) typically includes some combination of interesting and uninteresting code. However, user code does not include hosted code that belongs to the runtime 208. In one implementation, interesting code 212 is generated via via user input into any aspect of user input interface 144 (FIG. 1). For example, the user may select (e.g., via a pointing device, keyboard, voice activated techniques, etc.) specific ones of multiple methods displayed in a dialog box by the debugging service, or the user may type names of programming constructs into a command line interface, and/or the like. The debugger 206 notifies, via exposed debugging API 216 (which may also be implemented in two (2) parts; one part as a service of the runtime 208 and another part as a public component that implements 216 and is consumed by the debugger 206), the debugging service 214 of the identified interesting code 212.

At this point, the user directs the debugger 206 to begin JMC debugging operations, for example, by enabling a JMC menu item, command-line, or other JMC enabling instruction, and issuing a run or start command. This causes the debugger 206 to direct the JIT compiler 220 to convert the assembly into native code 210 for subsequent execution as process 202.

During assembly conversion operations, the JIT compiler 220 inserts JMC enabling components, flags 222 and debugging probes 224, into programming constructs (e.g., executable files/binaries, dynamic link libraries, class objects and methods, static functions, and/or the like) of the native code 210. In this implementation, the JIT enabling components are inserted immediately after the prolog of class methods and/or static functions. The JIT compiler 220 identifies such class methods and/or static functions by parsing the interesting code list/IDs 212, which as described above, was generated by the debugger 206.

A debugging probe 224 references an associated flag 222, via a compile-time constant pointer value, to determine whether to request the debugging service 214 to evaluate whether the particular thread of execution that has encountered the activated probe 224 is performing a JMC stepping operation, and if so, to halt the process 202. As we now describe, such a determination is not made for inactivated flags, but rather only for activated flags. An exemplary debugging probe 224 is represented as follows:

if(*pFlag){call JMC_Probe}, wherein pFlag is a compile-time constant pointer to a corresponding flag 222 (the "*" indicates that the address is to be de-referenced at run-time to yield value of the associated flag 222). The "JMC_Probe" portion of the probe 224 is a call to the JMC_Probe function 226. Through use of pointer indirection, pFlags from multiple programming constructs with respect to which they are inserted may all point to the same flag 222.

As illustrated, the call to JMC_Probe 226 is conditional, depending on whether the referenced flag 222 is activated or deactivated. For purposes of discussion, an activated flag 222 has a non-zero value, wherein a deactivated flag 222 has a zero (0) or null value. When a flag 222 is active, we say that the debugging probe 224 is active (e.g., an active probe), and vice-versa. For example, when a thread of execution encounters an active probe 224, the call to JMC_Probe 226 is made. Analogously, encountering a deactivated probe 224 produces no such call. This means that toggling a single flag 222 can respectively activate or deactivate each associated probe 224. Now, we describe how these novel JMC debugging probes 224 are utilized during debugging operations.

When the process 202 has been halted (via any traditional stopping mechanism, for example, via utilization of a traditional breakpoint), the debugger 206 allows the user to JMC step through the process 202 via JMC stepping command(s) 228 (i.e., JMC step-into, JMC step-out, and JMC step-over commands). Such commands are selected by the user, for example, via command-line and/or UI portions of user interface 144 (FIG. 1). Responsive to a JMC step command 228 (i.e., any one of the JMC step-in, step-out, and step-over commands 228) sent by debugger 206 to debugging service 214, the debugging service mass enables flags 222, and thereby activates the associated probes 224. A user need not be aware of which probes are active.

Activated debugging probes 224 allow process 202 threads of execution to run-free (i.e., at substantially full-speed and without unnecessary halting) through uninteresting code. Any thread that encounters an activated probe 224, which is located in interesting code, is halted (via TriggerMethodEntry 230) only when the encountered probe 224, via a call to JMC_Probe 226, determines that the thread is JMC stepping through the code. To this end, JMC_Probe 226 filters out threads that aren't doing JMC stepping by decoding the call stack (see, other data 232) to identify the instruction pointer (ip) and the frame-pointer (fp) of the method associated with the encountered ("triggered") debugging probe 224. If the current thread is doing JMC stepping, then JMC_Probe 226 passes the ip and fp parameters to TriggerMethodEntry 230, which then maps the ip back to the method to determine whether the method is "interesting", as indicated in the interesting code lists/IDs 212. (The runtime 208 does sufficient bookkeeping for the JIT compiler 220 to substantially guarantee that a debugging probe 224 can determine via a lookup operation, if the probe is located in interesting code). If the method is interesting, JMC_Probe 226 inserts a break op-code (i.e., a breakpoint 234, all breakpoints 234 are injected by JMC_Probe) after the debugging probe 224 and continues execution of the process such that the thread of execution will hit the breakpoint 234 and stop in the interesting code.

Additionally, if the JMC-stepping command 228 was a:
JMC step-in, debugging service 214 activates all JMC_probes 224 and places a breakpoint (not the JMC_Probe inserted breakpoint) after the call to the method being stepping into. Because JMC-probes 224 are at the start of all interesting code, and the probes are activated, if the call eventually invokes any "interesting" code (perhaps indirectly, by invoking non-interesting/framework code which eventually invokes "interesting" code), then the thread will hit an activated probe which will call TriggerMethodEntry 230—stopping the thread, the step completing in interesting code. If the call does not invoke any interesting code, then the thread will hit the breakpoint which was inserted after the call of the method being stepped-into (i.e., not the JMC_Probe inserted breakpoint 234), and the JMC step-in operations will complete. In this manner, the process 202 runs at full speed (i.e., uninterrupted by intermediate break op-codes) in between the time when the JMC-step-in starts and when it finishes.

JMC-step-out, JMC_Probe 226 automatically inserts a breakpoint 234 at the return address identified by the first stack frame to an interesting method. Thus, the breakpoint is not inserted in the same method wherein the debugging probe 224 was encountered. To locate the first stack frame with a return address to an interesting method, the debugging service 214 does a full walk up the process stack (i.e., unwinds the stack). The debugging service 214 utilizes one or more runtime 208 services in view of the "interesting method data" portion of "other data" 232, to determine whether a stack frame address is an interesting method's return address. Such interesting method data includes, for example, a respective substantially unique ID (e.g., a GUID) for each interesting method. In one implementation, the interesting method data is generated by the JIT compiler 220 during debugging probe 224 insertion operations JMC-step-over and the thread is not executing an instruction at the end of the method, causes JMC_Probe 226 to behave just like a traditional step-over. If the thread is at the end of the method, JMC_Probe 226 does both the actions from a step-in and a step-out such that the thread will stop at the first instance (line) of interesting code executed.

Responsive to completing of the JMC step command 228, which is evidenced by a JMC stepping thread being halted, the debugging service 214 disables all the probes (the debugger 206 only understands JMC step operations; it doesn't know anything about the probes). Deactivating probes 224 is a performance optimization to avoid unnecessary calls to JMC_Probe 226 that would otherwise occur when no threads of execution are JMC stepping.

In this implementation, flags 222 are enabled/disabled on a per-module basis (i.e., one (1) flag is inserted into each module). In this manner, each method in a module has the same value for pFlag. This particular implementation is based on a rational that code is interesting or not interesting on a per-module basis. It can be appreciated that different rational can be implemented in different embodiments as a function of a particular implementation's design. For instance, a flag 222 could also be inserted on a per-method basis; a tradeoff being the more flags 222, the fewer probes that can be enabled by flipping/toggling the value of a single flag 222.

Accordingly, all threads that encounter an active probe 224 result in call to JMC_Probe 226, even if the current thread is not JMC stepping. Only when JMC_Probe 226 determines that the thread is JMC stepping is the thread halted. Analogously, if an encountered debugging probe 224 is not active, the call to JMC_Probe 226 is skipped completely and thread continues execution as normal (i.e., runs-freely) through the process.

In this implementation, the call to JMC_Probe function 226 is substantially optimized in size because it takes no parameters and has no return value. This provides for optimizing all "callsites" (locations wherein respective calls are made to the JMC_Probe function 226). Thus, if a call to JMC_Probe from the debugging probe 224 is made from the probe (e.g., when *pFlag !=0), the call will not be a heavy-weight call. This means that the call does not require pushing and pulling function parameters to/from the stack, which in turn means that the JMC_Probe callsite is considerably light-weight as compared to a function that does push and pull parameters. The only processing overhead a thread that encounters an inactive probe 224 undergoes is the processing it takes to evaluate flag 222 (via a *pFlag) and a jump to the next instruction after the inserted debugging probe 224. In this manner, the described JMC debugging operations allow threads to run-free at substantially full-speed through all uninteresting code until interesting code is encountered. .

In this implementation, the runtime 208 is based on a Common Language Infrastructure (CLI) that provides specifications for executable code and the virtual execution environment in which it runs. Thus, although separately illustrated in FIG. 2, the process 208 and the runtime 202 are part of the same execution environment (i.e., the process 202 hosts the runtime 208).

Exemplary Procedure

Figure 3:
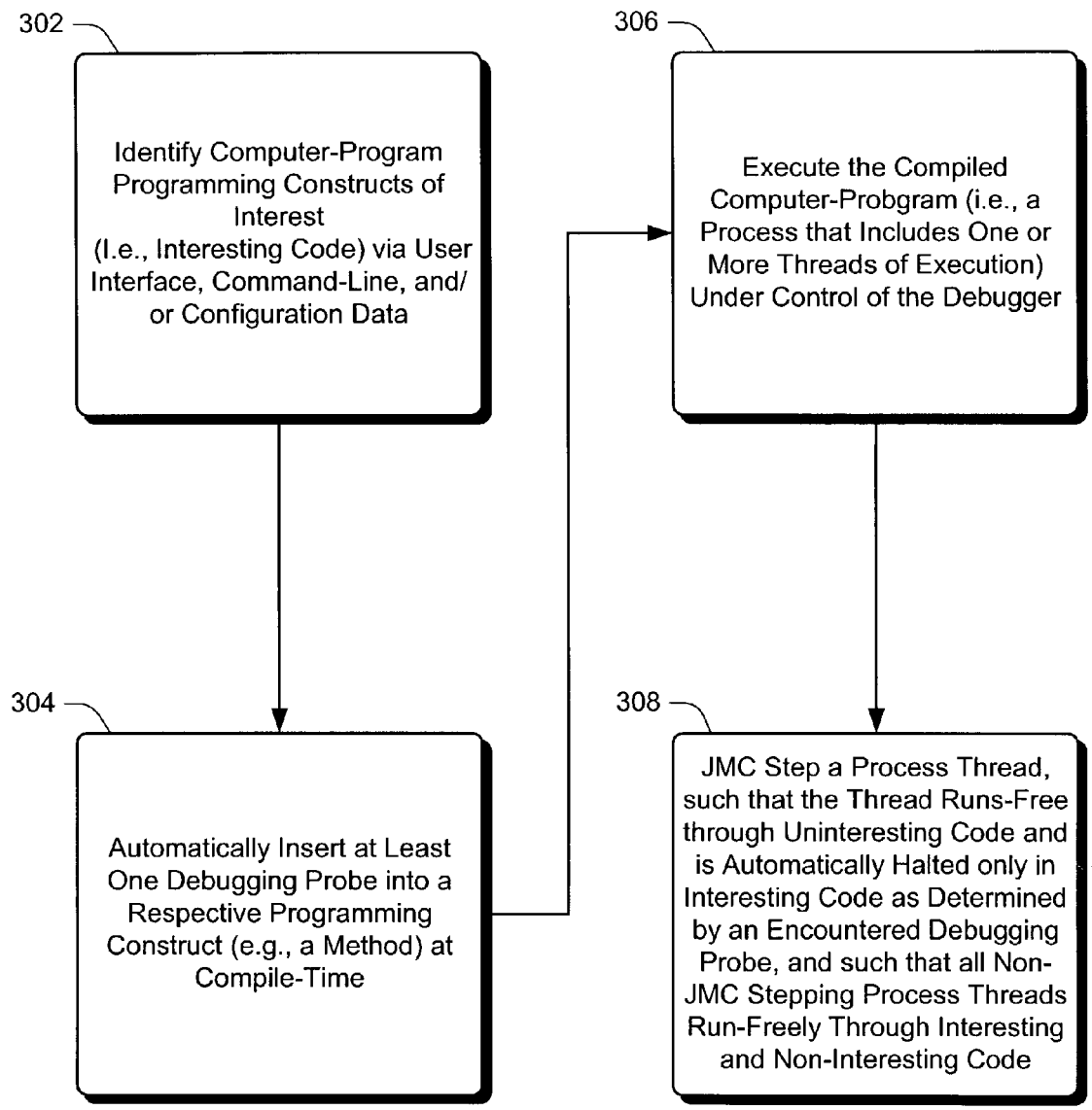
FIG. 3 shows an exemplary procedure for debugging Just-My-Code.

FIG. 3 shows an exemplary procedure 300 for JMC debugging. For purposes of discussion, these procedural operations are described in reference to program module and data features of FIGS. 1 and 9. At block 302, debugger 206 (FIG. 2) identifies computer-program programming constructs (e.g., object methods and/or static functions) of interest. In one implementation, this is accomplished via user input into any aspect of user input interface 144 (FIG. 1). For example, the user may select (e.g., via a pointing device, keyboard, voice activated techniques, etc.) specific ones of multiple methods displayed in a dialog box by the debugging service, or the user may type names of programming constructs into a command line interface, and/or the like. Such user input is saved in interesting code list/IDs 212 (FIG. 2), which is read by the runtime compiler 220 (FIG. 2) to identify the programming constructs of interest (i.e., interesting code).

At block 304, the debugger 206 (FIG. 2) instructs a compiler, such as the Just-In-Time (JIT) compiler 220 of FIG. 2, to automatically insert JMC enabling components 222 and 224 into each respective programming construct (e.g., method) of the computer-program during compilation operations. In this implementation, the JIT compiler 220 compiles an assembly to generate native code 210 (FIG. 2), into which the respective flags 222 and debugging probes 224 are automatically inserted. At block 306, the native code 210 (FIG. 2) is executed under control of the debugger 206 as process 202 (FIG. 2). The process 202 includes any number of threads of execution as a function of the process' particular implementation.

At block 308, the debugger 206 (FIG. 2) allows the user to JMC Step a thread through the process 202 via input of a JMC stepping command 228 (FIG. 2). Since the thread is JMC-stepping, the thread is called an "interested thread". The process 202 may be multi-threaded and include a thread that is not JMC-stepping, which is called a "non-interested thread". An interested thread runs-free (without halting) through uninteresting code (i.e., any code that does not correspond to the interesting code identified by selected/individual ones of the programming constructs selected at block 302). The interested thread is automatically halted by the debugging service 214 whenever it first encounters an active debugging probe 224. The determination of whether a thread of process 202 (FIG. 2) is an interested thread and whether the interested thread is executing/accessing code in one of the selected programming constructs is determined at run-time by the encountered debugging probe 224. Thus, all non-JMC stepping thread(s) run-freely through all encountered debugging probe(s) 224 in both interesting and uninteresting code.

CONCLUSION

The described systems and methods provide JMC debugging. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A computer-readable medium comprising computer-program instructions for Just-My-Code (JMC) debugging, the computer-program instructions being executable by a processor comprising:

automatically identifying a set of programming constructs representing interesting code by comparing an assembly to an interesting code list, whereby the set differentiates portions of the assembly that are interesting from those portions that are uninteresting;

automatically inserting flags and debugging probes into respective programming constructs representing interesting code, the debugging probes being inserted during computer-program compiling operations to generate native code by parsing the interesting code list generated by the debugger, wherein the debugging probes reference an associated flag via a compile-time constant pointer value to determine whether to request the debugging service, the debugging probe represented by:

if(*pFlag){call JMC Probe} wherein pFlag is a compile-time constant pointer to the associated flag, * indicates an address is to be de-referenced at run-time to yield value of the associated flag and "JMC Probe" is a call to a JMC Probe function; and executing the native code as a process, the process comprising one or more threads of execution that run-free through uninteresting code during a JMC step operation, a thread of the one or more threads only being halted in the interesting code when an active one of the debugging probes is encountered by the thread while the thread is JMC stepping through the process.

2. A computer-readable medium as recited in claim 1, wherein the respective programming constructs are class methods and/or static functions.

3. A computer-readable medium as recited in claim 1, wherein JMC stepping comprises issuance of a JMC step-in, a JMC step-out, or a JMC step-over command by a debugger.

4. A computer-readable medium as recited in claim 1, wherein the computer-program instructions further comprise instructions for:

responsive to encountering the active one, dereferencing the compile-time constant corresponding to the active one to determine whether any of the one or more threads of execution are JMC stepping;

if at least one thread is JMC stepping, calling the debugging service to determine if the thread is JMC stepping;

responsive to determining that the thread is JMC stepping, halting the thread at a line of code subsequent to the active one; and responsive to determining that the thread is not JMC stepping, not automatically inserting a breakpoint into the code to halt the thread.

5. A computer-readable medium as recited in claim 1, wherein the computer-program instructions further comprise instructions for:

responsive to encountering the active one, dereferencing the compile-time constant corresponding to the active one to determine whether any of the one or more threads of execution are JMC stepping;

if at least one thread is JMC stepping, calling the debugging service to determine if the thread is JMC stepping; and responsive to determining that the thread is JMC stepping:
halting the thread at a line of code subsequent to the active one;
removing a corresponding breakpoint; and
de-activating each probe of the debugging probes.

6. A computer-readable medium as recited in claim 1, wherein the computer-program instructions further comprise instructions for:

responsive to encountering the active one, dereferencing the compile-time constant corresponding to the active one to determine whether any of the one or more threads of execution are JMC stepping;

if at least one thread is JMC stepping, calling the debugging service to determine if the thread is JMC stepping; and responsive to determining that the thread is JMC stepping-in, placing a breakpoint at a line of code immediately subsequent to a call to a programming construct that the thread is JMC stepping into.

7. A computer-readable medium as recited in claim 1, wherein the computer-program instructions further comprise instructions for:

responsive to encountering the active one, dereferencing the compile-time constant corresponding to the active one to determine whether any of the one or more threads of execution are JMC stepping;

if at least one thread is JMC stepping, calling the debugging service to determine if the thread is JMC stepping; and responsive to determining that the thread is JMC stepping-out:
identifying a return address of a first stack frame to an interesting programming construct; and
inserting a breakpoint at the return address.

8. A computer-readable medium as recited in claim 1, wherein the computer-program instructions further comprise instructions for:

responsive to encountering the active one, dereferencing the compile-time constant corresponding to the active one to determine whether any of the one or more threads of execution are JMC stepping;

if at least one thread is JMC stepping, calling the debugging service to determine if the thread is JMC stepping; and responsive to determining that the thread is JMC stepping-over:
determining if the thread is near method end; and
responsive to determining, if the thread is near method end, halting the thread at a first line of next interesting code that is executed.

9. A computer-readable medium as recited in claim 1, wherein the computer-program instructions further comprise instructions for identifying the interesting code as specific ones of the programming constructs.

10. A computer-readable medium as recited in claim 9, wherein the specific ones of the programming constructs are identified via user interface, command line, and/or configuration file data input.

11. A method for Just-My-Code (JMC) debugging, the method comprising:

automatically identifying a set of programming constructs representing interesting code by comparing an assembly to an interesting code list, whereby the set differentiates portions of the assembly that are interesting from those portions that are uninteresting;

automatically inserting flags debugging probes into respective programming constructs representing interesting code, the debugging probes being inserted during computer-program compiling operations to generate native code by parsing the interesting code list generated by the debugger, wherein the debugging probes reference an associated flag via a compile-time constant pointer value to determine whether to request the debugging service, the debugging probe represented by:

if(*pFlag){call JMC Probe} wherein pFlag is a compile-time constant pointer to the associated flag, * indicates an address is to be de-referenced at run-time to yield value of the associated flag and "JMC Probe" is a call to a JMC Probe function;

executing the native code as a process, the process comprising one or more threads of execution that run-free through uninteresting code during a JMC step operation, a thread of the one or more threads only being halted in the interesting code when an active one of the debugging probes is encountered by the thread while the thread is JMC stepping through the process; and wherein JMC stepping comprises a JMC step-in, a JMC step-out, or a JMC step-over operation.

12. A method as recited in claim 11, wherein the respective programming constructs are class methods and/or static functions.

13. A method as recited in claim 11, wherein the method further comprises:

responsive to encountering the active one, dereferencing the compile-time constant corresponding to the active one to determine whether any of the one or more threads of execution are JMC stepping;

if at least one thread is JMC stepping, calling the debugging service to determine if the thread is JMC stepping;

responsive to determining that the thread is JMC stepping, halting the thread at a line of code subsequent to the active one; and responsive to determining that the thread is not JMC stepping, not automatically inserting a breakpoint into the code to halt the thread.

14. A method as recited in claim 11, wherein the method further comprises:

responsive to encountering the active one, dereferencing the compile-time constant corresponding to the active one to determine whether any of the one or more threads of execution are JMC stepping;

if at least one thread is JMC stepping, calling the debugging service to determine if the thread is JMC stepping; and responsive to determining that the thread is JMC stepping:
halting the thread at a line of code subsequent to the active one;
removing a corresponding breakpoint; and
de-activating each probe of the debugging probes.

15. A method as recited in claim 11, wherein the method further comprises:

responsive to encountering the active one, dereferencing the compile-time constant corresponding to the active one to determine whether any of the one or more threads of execution are JMC stepping;

if at least one thread is JMC stepping, calling the debugging service to determine if the thread is JMC stepping; and responsive to determining that the thread is JMC stepping-in, placing a breakpoint at a line of code immediately subsequent to a call to a programming construct that the thread is JMC stepping into.

16. A method as recited in claim 11, wherein the method further comprises:

responsive to encountering the active one, dereferencing the compile-time constant corresponding to the active one to determine whether any of the one or more threads of execution are JMC stepping;
if at least one thread is JMC stepping, calling the debugging service to determine if the thread is JMC stepping; and
responsive to determining that the thread is JMC stepping-out:
identifying a return address of a first stack frame to an interesting programming construct; and
inserting a breakpoint at the return address.

17. A method as recited in claim 11, wherein the method further comprises:
responsive to encountering the active one, dereferencing the compile-time constant corresponding to the active one to determine whether any of the one or more threads of execution are JMC stepping;
if at least one thread is JMC stepping, calling the debugging service to determine if the thread is JMC stepping; and
responsive to determining that the thread is JMC stepping-over:
determining if the thread is near method end; and
responsive to determining, if the thread is near method end, halting the thread at a first line of next interesting code that is executed.

18. A method as recited in claim 11, wherein the method further comprises identifying the interesting code as specific ones of the programming constructs.

19. A computing device for Just-My-Code (JMC) debugging, the computing device comprising:
a processor; and
a memory coupled to the processor, the memory comprising computer-program instructions executable by the processor comprising:
automatically identifying a set of programming constructs representing interesting code by comparing an assembly to an interesting code list, whereby the set differentiates portions of the assembly that are interesting from those portions that are uninteresting;
automatically inserting flags and debugging probes into respective programming constructs representing interesting code, the debugging probes being inserted during computer-program compiling operations to generate native code by parsing the interesting code list generated by the debugger, wherein the debugging probes reference an associated flag via a compile-time constant pointer value to determine whether to request the debugging service, the debugging probe represented by:

if(*pFlag){call JMC Probe} wherein pFlag is a compile-time constant pointer to the associated flag, * indicates an address is to be de-referenced at run-time to yield value of the associated flag and "JMC Probe" is a call to a JMC Probe function, the programming constructing comprising class methods and/or static functions; and
executing the native code as a process, the process comprising one or more threads of execution that run-free through uninteresting code during a JMC step operation, a thread of the one or more threads only being halted in the interesting code when an active one of the debugging probes is encountered by the thread while the thread is JMC stepping through the process.

20. A computing device as recited in claim 19, wherein JMC stepping comprises issuance of a JMC step-in, a JMC step-out, or a JMC step-over command by a debugger.

21. A computing device as recited in claim 19, wherein each debugging probe comprises a compile-time constant and a call to a debugging service, and wherein the computer-program instructions further comprise instructions for:
responsive to encountering the active one, dereferencing the compile-time constant corresponding to the active one to determine whether any of the one or more threads of execution are JMC stepping;
if at least one thread is JMC stepping, calling the debugging service to determine if the thread is JMC stepping;
responsive to determining that the thread is JMC stepping, halting the thread at a line of code subsequent to the active one; and
responsive to determining that the thread is not JMC stepping, not automatically inserting a breakpoint into the code to halt the thread.

22. A computing device as recited in claim 19, wherein the computer-program instructions further comprise instructions for:
responsive to encountering the active one, dereferencing the compile-time constant corresponding to the active one to determine whether any of the one or more threads of execution are JMC stepping;
if at least one thread is JMC stepping, calling the debugging service to determine if the thread is JMC stepping; and
responsive to determining that the thread is JMC stepping:
halting the thread at a line of code subsequent to the active one;
removing a corresponding breakpoint; and
de-activating each probe of the debugging probes.

23. A computing device as recited in claim 19, wherein the computer-program instructions further comprise instructions for:
responsive to encountering the active one, dereferencing the compile-time constant corresponding to the active one to determine whether any of the one or more threads of execution are JMC stepping;
if at least one thread is JMC stepping, calling the debugging service to determine if the thread is JMC stepping; and
responsive to determining that the thread is JMC stepping-in, placing a breakpoint at a line of code immediately subsequent to a call to a programming construct that the thread is JMC stepping into.

24. A computing device as recited in claim 19, wherein the computer-program instructions further comprise instructions for:
responsive to encountering the active one, dereferencing the compile-time constant corresponding to the active one to determine whether any of the one or more threads of execution are JMC stepping;
if at least one thread is JMC stepping, calling the debugging service to determine if the thread is JMC stepping; and
responsive to determining that the thread is JMC stepping-out:
identifying a return address of a first stack frame to an interesting programming construct; and
inserting a breakpoint at the return address.

25. A computing device as recited in claim 19, wherein the computer-program instructions further comprise instructions for:
responsive to encountering the active one, dereferencing the compile-time constant corresponding to the active one to determine whether any of the one or more threads of execution are JMC stepping;
if at least one thread is JMC stepping, calling the debugging service to determine if the thread is JMC stepping; and
responsive to determining that the thread is JMC stepping-over:
determining if the thread is near method end; and responsive to determining, if the thread is near method end, halting the thread at a first line of next interesting code that is executed.

26. A computing device as recited in claim 19, wherein the computer-program instructions further comprise instructions for identifying the interesting code as specific ones of the programming constructs.

27. A computing device for Just-MY-Code (JMC) debugging, the computing device comprising:
  means for automatically identifying a set of programming constructs representing interesting code by comparing an assembly to an interesting code list, whereby the set differentiates portions of the assembly that are interesting from those portions that are uninteresting
  means for automatically inserting flags and debugging probes into respective programming constructs representing interesting code, the debugging probes being inserted during computer-program compiling operations to generate native code by parsing the interesting code list generated by the debugger, wherein the debugging probes reference an associated flag via a compile-time constant pointer value to determine whether to request the debugging service, the debugging probe represented by:

if(*pFlag){call JMC Probe} wherein pFlag is a compile-time constant pointer to the associated flag, * indicates an address is to be de-referenced at run-time to yield value of the associated flag and "JMC Probe" is a call to a JMC Probe function, the programming constructing comprising class methods and/or static functions; and
  means for executing the native code as a process, the process comprising one or more threads of execution that run-free through uninteresting code during a JMC step operation, a thread of the one or more threads only being halted in the interesting code when an active one of the debugging probes is encountered by the thread while the thread is JMC stepping through the process.

28. A computing device as recited in claim 27, wherein JMC stepping comprises a JMC step-in, a JMC step-out, or a JMC step-over operation.

29. A computing device as recited in claim 27, and further comprising:
  responsive to encountering the active one, means for determining whether any of the one or more threads of execution are JMC stepping;
  if at least one thread is JMC stepping, means for determining if the thread is JMC stepping;
  responsive to determining that the thread is JMC stepping, means for halting the thread at a line of code subsequent to the active one; and
  responsive to determining that the thread is not JMC stepping, means for not automatically halting the thread in the interesting code.

30. A computing device as recited in claim 27, and further comprising:
  responsive to encountering the active one, means for determining whether any of the one or more threads of execution are JMC stepping;
  if at least one thread is JMC stepping, means for determining if the thread is JMC stepping;
  responsive to determining that the thread is JMC stepping-in, means for halting the thread at a line of code immediately subsequent to a call to a programming construct that the thread is JMC stepping into.

31. A computing device as recited in claim 27, and further comprising:
  responsive to encountering the active one, means for determining whether any of the one or more threads of execution are JMC stepping;
  if at least one thread is JMC stepping, means for determining if the thread is JMC stepping;
  responsive to determining that the thread is JMC stepping-out:
  means for identifying a return address of a first stack frame to an interesting programming construct; and
  means for halting the thread at the return address.

32. A computing device as recited in claim 27, and further comprising:
  responsive to encountering the active one, means for determining whether any of the one or more threads of execution are JMC stepping;
  if at least one thread is JMC stepping, means for determining if the thread is JMC stepping;
  responsive to determining that the thread is JMC stepping-over:
  means for determining if the thread is near method end; and
  responsive to determining, if the thread is near method end, means for halting the thread at a first line of next interesting code that is executed.

33. A computing device as recited in claim 27, wherein computing device further comprises means for identifying the interesting code as specific ones of the programming constructs.

* * * * *